(12) United States Patent
Makino et al.

(10) Patent No.: US 11,383,871 B2
(45) Date of Patent: Jul. 12, 2022

(54) WEIGHING AND PACKAGING SYSTEM

(71) Applicant: Ishida Co., Ltd., Kyoto (JP)

(72) Inventors: Koichi Makino, Ritto (JP); Takashi Matsumoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 579 days.

(21) Appl. No.: 16/482,191

(22) PCT Filed: Jan. 22, 2018

(86) PCT No.: PCT/JP2018/001809
§ 371 (c)(1),
(2) Date: Jul. 30, 2019

(87) PCT Pub. No.: WO2018/142988
PCT Pub. Date: Aug. 9, 2018

(65) Prior Publication Data
US 2020/0115089 A1 Apr. 16, 2020

(30) Foreign Application Priority Data

Jan. 31, 2017 (JP) .............................. JP2017-015521

(51) Int. Cl.
*B65B 57/14* (2006.01)
*G01G 19/52* (2006.01)
*B65B 39/00* (2006.01)

(52) U.S. Cl.
CPC .............. *B65B 57/14* (2013.01); *B65B 39/00* (2013.01); *G01G 19/52* (2013.01)

(58) Field of Classification Search
CPC ......... B65B 57/14; B65B 57/00; B65B 57/10; B65B 39/00; G01G 19/52
See application file for complete search history.

(56) References Cited

U.S. PATENT DOCUMENTS 4,480,753 A * 11/1984 Thomas .................. B07C 5/344
209/657
4,813,205 A * 3/1989 Mikata .................... B65B 57/00
53/52

(Continued)

FOREIGN PATENT DOCUMENTS

CN 2289751 Y 9/1998
CN 204223197 U 3/2015

(Continued)

OTHER PUBLICATIONS

The extended European search report issued by the European Patent Office dated Oct. 7, 2020, which corresponds to European Patent Application No. 18747472.1-1014 and is related to U.S. Appl. No. 16/482,191.

(Continued)

*Primary Examiner* — Thomas M Wittenschlaeger
(74) *Attorney, Agent, or Firm* — Studebaker & Brackett PC (57) ABSTRACT

Provided is a weighing and packaging system including: a weighing unit which weighs and sequentially discharges articles; a discharge chute through which the articles discharged from the weighing unit pass; a foreign matter detecting unit which detects the foreign matter contained in the article passing through the discharge chute; a memory unit which stores quality information pertaining to the quality of the article based on a detection result of the foreign matter detecting unit; and a control unit which controls the memory unit, in which in a case where the foreign matter is detected by the foreign matter detecting unit with respect to the $N^{th}$ (N is an integer of 2 or more) article discharged from the weighing unit, the control unit controls the memory unit to forcibly store the quality (Continued)

information of the $(N-1)^{th}$ article discharged from the weighing unit as a poor quality.

10 Claims, 8 Drawing Sheets

(56) References Cited

U.S. PATENT DOCUMENTS

| | | | | |
|---|---|---|---|---|
| 8,371,910 | B2* | 2/2013 | Fredberger | B65B 9/12 452/40 |
| 9,599,679 | B2* | 3/2017 | Taylor | G01V 3/10 |
| 2004/0094335 | A1* | 5/2004 | Kageyama | G01G 19/393 177/25.18 |
| 2009/0260896 | A1* | 10/2009 | Fujii | G01G 19/393 177/25.18 |

FOREIGN PATENT DOCUMENTS

| | | |
|---|---|---|
| CN | 205131712 U | 4/2016 |
| DE | 10050845 A1 | 4/2001 |
| JP | S62-271817 A | 11/1987 |
| JP | 2002-104323 A | 4/2002 |
| JP | 2002-120813 A | 4/2002 |
| JP | 2002-296099 A | 10/2002 |
| JP | 2004-352287 A | 12/2004 |
| JP | 2008-233099 A | 10/2008 |
| JP | 2009192316 A * | 8/2009 ............ G01G 11/12 |
| JP | 2011-219138 A | 11/2011 |
| JP | 2012-252662 A | 12/2012 |

OTHER PUBLICATIONS

International Search Report issued in PCT/JP2018/001809; dated Mar. 20, 2018.

An Office Action mailed by China National Intellectual Property Administration dated Sep. 1, 2020, which corresponds to Chinese Patent Application No. 201880009040.9 and is related to U.S. Appl. No. 16/482,191 with English language translation.

International Preliminary Report on Patentability issued in corresponding International Application No. PCT/JP2018/001809; dated Aug. 15, 2019.

* cited by examiner

WEIGHING AND PACKAGING SYSTEM

TECHNICAL FIELD

One aspect of the present invention relates to a weighing and packaging system.

BACKGROUND ART

In the related art, a weighing and packaging system including a weighing unit which weighs and sequentially discharges articles, a discharge chute which is disposed below the weighing unit and through which the articles discharged from the weighing unit pass, and a foreign matter detecting unit which detects the foreign matter contained in the article passing through the discharge chute is known (refer to, for example, Patent Literature 1). In such a weighing and packaging system, in a case where the foreign matter is detected by the foreign matter detecting unit with respect to the article discharged from the weighing unit, the article is treated as a defective article.

CITATION LIST

Patent Literature

Patent Literature 1: Japanese Unexamined Patent Publication No. 2002-120813

SUMMARY OF INVENTION

Technical Problem

In the weighing and packaging system as described above, for example, in a case where the foreign matter is mixed into the $N^{th}$ (N is an integer of 2 or more) article discharged from the weighing unit, when the falling speed of the foreign matter is higher than that of the article, there is a possibility that the foreign matter may enter the $(N-1)^{th}$ article side discharged from the weighing unit.

One aspect of the present invention is to provide a weighing and packaging system capable of suppressing distribution of a foreign matter mixed article.

Solution to Problem

According to one aspect of the present invention, there is provided a weighing and packaging system including: a weighing unit which weighs and sequentially discharges articles; a discharge chute which is disposed below the weighing unit and through which the articles discharged from the weighing unit pass; a foreign matter detecting unit which detects the foreign matter contained in the article passing through the discharge chute; a memory unit which stores quality information pertaining to the quality of the article based on a detection result of the foreign matter detecting unit; and a control unit which controls the memory unit, in which in a case where the foreign matter is detected by the foreign matter detecting unit with respect to the $N^{th}$ (N is an integer of 2 or more) article discharged from the weighing unit, the control unit controls the memory unit to forcibly store the quality information of the $(N-1)^{th}$ article discharged from the weighing unit as a poor quality.

In this weighing and packaging system, in a case where the foreign matter is detected by the foreign matter detecting unit with respect to the $N^{th}$ article discharged from the weighing unit, the memory unit is controlled to forcibly store quality information of the $(N-1)^{th}$ article discharged from the weighing unit as a poor quality. As a result, even in a case where the foreign matter mixed into the $N^{th}$ article discharged from the weighing unit enters the $(N-1)^{th}$ article side discharged from the weighing unit, it is possible to suppress the distribution of the $(N-1)^{th}$ article discharged from the weighing unit as a foreign matter mixed article. Therefore, in this weighing and packaging system, it is possible to suppress the distribution of the foreign matter mixed article.

In one embodiment, in a case where the foreign matter is detected by the foreign matter detecting unit with respect to the $N^{th}$ article discharged from the weighing unit, the control unit may control the memory unit to store the quality information of the $N^{th}$ article discharged from the weighing unit as a poor quality. With this configuration, in a case where the foreign matter mixed into the N article discharged from the weighing unit is retained in the $N^{th}$ article side discharged from the weighing unit, it is possible to suppress the distribution of the $N^{th}$ article discharged from the weighing unit as a foreign matter mixed article.

In one embodiment, the weighing and packaging system may further include a gate mechanism which is disposed below the discharge chute and which receives and temporarily retains the article being discharged and falling from the weighing unit and discharges the retained article by opening and closing a gate. With this configuration, by providing the gate mechanism as a buffer, it is possible to improve the operation rate.

In one embodiment, in a case where the foreign matter is detected by the foreign matter detecting unit with respect to the $N^{th}$ article discharged from the weighing unit, the control unit may control the gate mechanism to discharge the $N^{th}$ article discharged from the weighing unit, to the outside. With this configuration, in a case where the foreign matter is detected by the foreign matter detecting unit with respect to the $N^{th}$ article discharged from the weighing unit, the $N^{th}$ article discharged from the weighing unit can be discharged at the gate mechanism to the outside.

In one embodiment, the gate mechanism may include a swing chute configured to be able to swing between a first position and a second position, and in a case where the foreign matter is detected by the foreign matter detecting unit with respect to the $N^{th}$ article discharged from the weighing unit, the control unit may control the swing chute to move from the second position to the first position so that the $N^{th}$ article discharged from the weighing unit is discharged from the swing chute to the outside. With this configuration, in a case where the foreign matter is detected by the foreign matter detecting unit with respect to the $N^{th}$ article discharged from the weighing unit, the swing chute is controlled to move from the second position to the first position, and the $N^{th}$ article discharged from the weighing unit can be discharged from the swing chute to the outside.

In one embodiment, a timing at which the article is discharged from the weighing unit and a timing at which the gate is opened and closed may be adjusted based on a falling time of the article from the time when the article is discharged from the weighing unit to the time when the article reaches the gate mechanism. With this configuration, it is possible to further improve the operation rate.

In one embodiment, the timing at which the article is discharged from the weighing unit and the timing at which the gate is opened and closed may be adjusted based on the falling time so that the article is discharged from the weighing unit in a state where the gate is opened, and the gate is closed before the article discharged from the weighing unit reaches the gate. With this configuration, it is possible to reliably improve the operation rate.

In one embodiment, the gate mechanism may include a swing chute which is configured to be able to swing between a first position and a second position and a fixed chute which is fixed below the swing chute and to which the article discharged from the swing chute located at the second position is supplied. With this configuration, it is possible to further reliably improve the operation rate.

In one embodiment, the weighing and packaging system may further include a packaging unit which packages the article discharged from the discharge chute, in which in a case where the foreign matter is detected by the foreign matter detecting unit with respect to the $N^{th}$ article discharged from the weighing unit, the control unit controls the packaging unit to discharge the $(N-1)^{th}$ article discharged from the weighing unit, to the outside. With this configuration, in a case where the foreign matter is detected by the foreign matter detecting unit with respect to the $N^{th}$ article discharged from the weighing unit, the $(N-1)^{th}$ article discharged from the weighing unit can be discharged at the packaging unit to the outside.

In one embodiment, the weighing and packaging system further includes an inspection unit which performs predetermined inspection on the article on the downstream side of the foreign matter detecting unit, in which in a case where an inspection result by the inspection unit for the $(N-1)^{th}$ article discharged from the weighing unit is a good quality, when the quality information of the $(N-1)^{th}$ article discharged from the weighing unit is a poor quality, the control unit maintains the quality information of the $(N-1)^{th}$ article discharged from the weighing unit as a poor quality. With this configuration, even in a case where the inspection result by the inspection unit for the $(N-1)^{th}$ article discharged from the weighing unit is a good quality, when the quality information of the $(N-1)^{th}$ article discharged from the weighing unit is a poor quality, the quality information of the $(N-1)^{th}$ article discharged from the weighing unit is maintained as a poor quality, so that it is possible to suppress the distribution of the $(N-1)^{th}$ article discharged from the weighing unit as a foreign matter mixed article.

Advantageous Effects of Invention

According to one aspect of the present invention, it is possible to suppress distribution of foreign matter mixed article.

DESCRIPTION OF EMBODIMENTS

Hereinafter, an embodiment of the present invention will be described in detail with reference to the drawings. In the following description, the same or corresponding elements are denoted by the same reference numerals, and duplicate description thereof is omitted.

Figure 1:
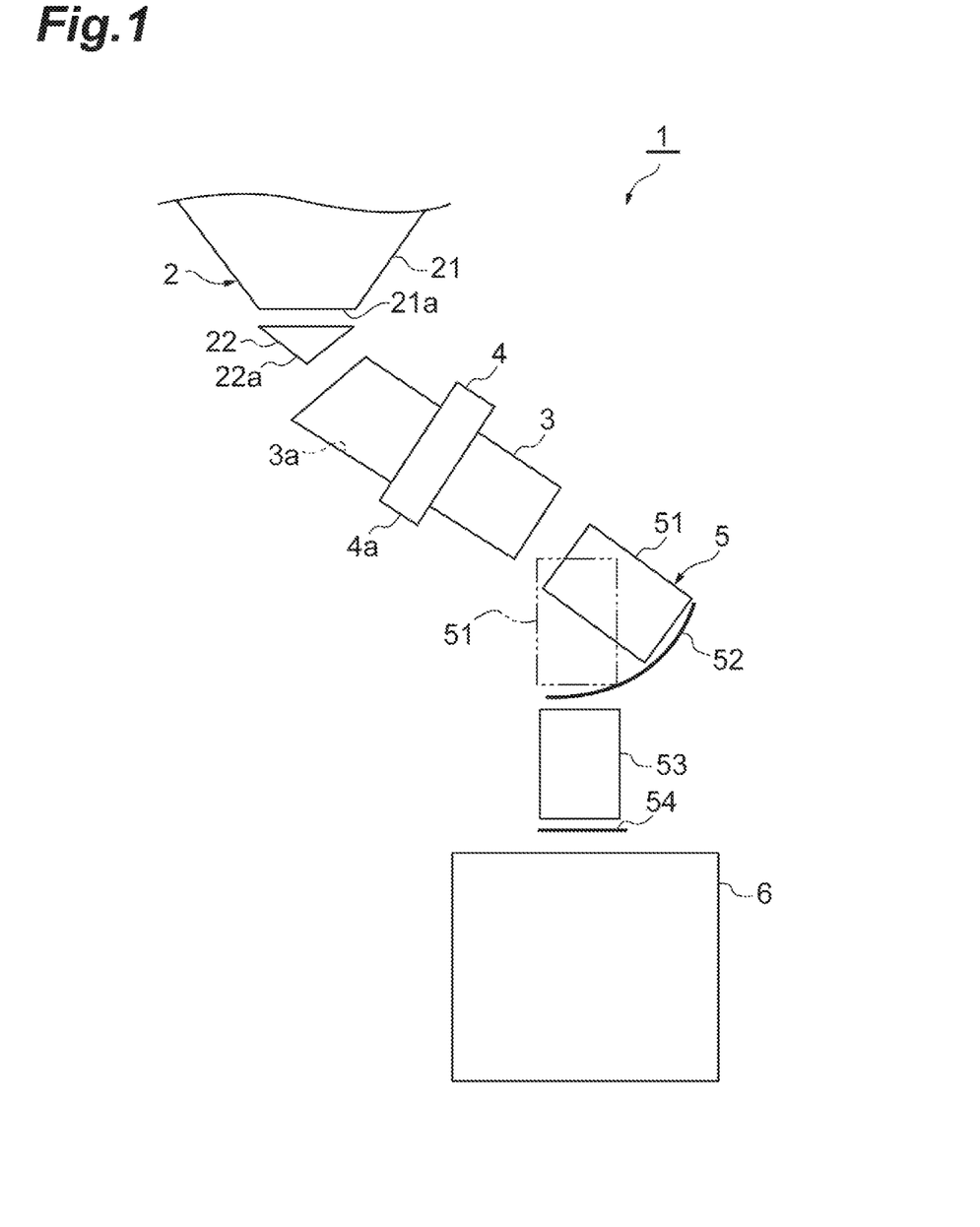
FIG. 1 is a schematic configuration diagram of a weighing and packaging system according to an embodiment of the present invention.
Figure 2:
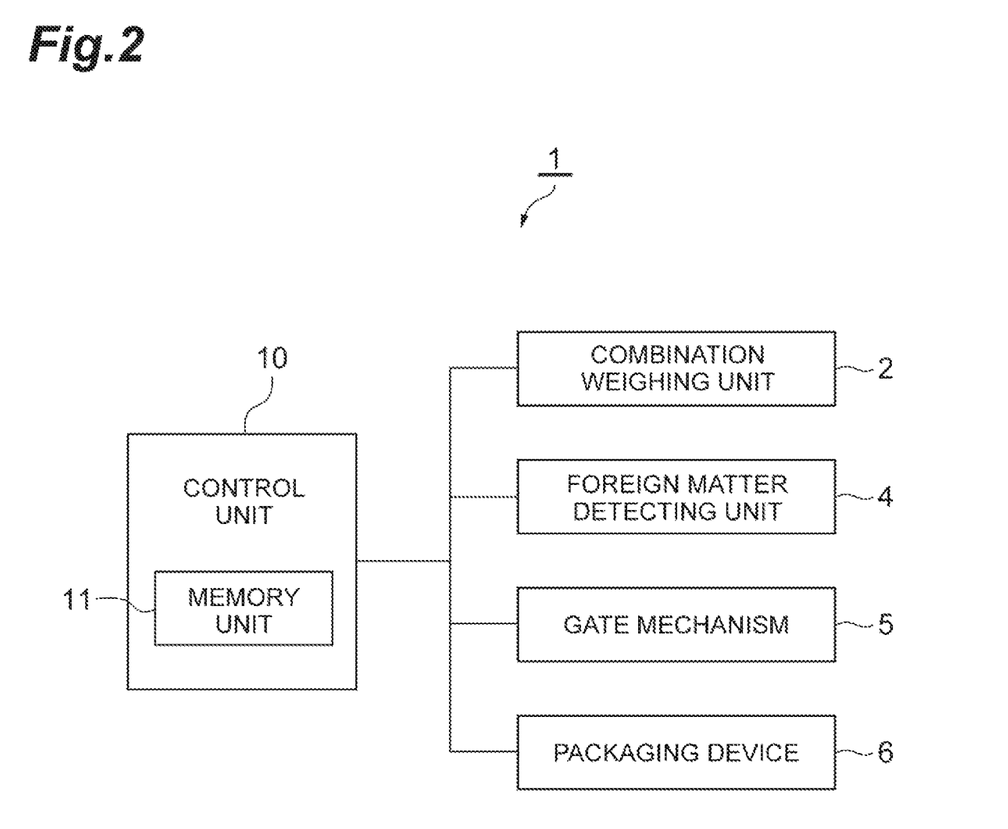
FIG. 2 is a block diagram of the weighing and packaging system of FIG. 1.

As illustrated in FIGS. 1 and 2, a weighing and packaging system 1 includes a combination weighing device (weighing unit) 2, a discharge chute 3, a foreign matter detecting unit 4, a gate mechanism 5, a packaging device (packaging unit) 6, a control unit 10, and a memory unit 11. In the weighing and packaging system 1, articles A (refer to FIG. 4) are weighed and sequentially discharged by the combination weighing device 2. Then, the articles A discharged from the combination weighing device 2 are sequentially packaged by the packaging device 6, so that a product is manufactured. The article A is an article that varies in unit mass, such as an agricultural article, a fishery article, or a processed food article and is supplied to the combination weighing device 2 from the outside of the weighing and packaging system 1.

The combination weighing device 2 includes a plurality of weighing hoppers (not illustrated) which temporarily store the articles A and a plurality of load cells (not illustrated) which output a weighed value corresponding to the mass of the articles A stored in each of the plurality of weighing hoppers. The combination weighing device 2 executes a combination weighing process for selecting a combination of the weighed values from a plurality of weighed values which are weighed by the load cells and respectively associated with the plurality of weighing hoppers so that a total value becomes the target weighed value and causing the weighing hoppers corresponding to the combination to discharge the article A.

The combination weighing device 2 further includes a collecting chute 21 and a timing hopper 22. The collecting chute 21 is, for example, a cylindrical body having a frustum shape tapering downward. The collecting chute 21 receives the article A discharged from the weighing hopper and discharges the article downward from a discharge port 21a. The timing hopper 22 is disposed below the collecting chute 21. The timing hopper 22 has a gate 22a that can be opened and closed with respect to a bottom thereof. The timing hopper 22 temporarily stores the articles A discharged from the collecting chute 21 by closing the gate 22a. Furthermore, the timing hopper 22 discharges the stored article A downward by opening the gate 22a.

The discharge chute 3 is disposed below the timing hopper 22 and cause the articles A to be discharged from the combination weighing device 2 to pass. The discharge chute 3 is, for example, a cylindrical body having a conveying surface 3a inclined with respect to the horizontal direction. In the discharge chute 3, the article A discharged from the timing hopper 22 is supplied to the upper end side of the conveying surface 3a. The article A supplied to the conveying surface 3a slides on the conveying surface 3a and falls, so that the article is discharged from the lower end portion of the discharge chute 3.

The foreign matter detecting unit 4 is provided, for example, in an intermediate portion in the extending direction of the discharge chute 3. The foreign matter detecting unit 4 detects the foreign matter contained in the article A that is discharged from the combination weighing device 2 and headed toward the gate mechanism 5. The foreign matter detecting unit 4 is, for example, a metal inspection device that detects a metal contained in the article A as a foreign matter by utilizing an interaction between a magnetic field and the metal. The foreign matter detecting unit 4 has an annular portion 4a arranged so as to surround the outer circumference of the discharge chute 3. When the article A passes inside the annular portion 4a, the foreign matter detecting unit 4 detects the metal (metal falling together with the article A) contained in the article A. As a metal mixed into the article A, for example, a metal part such as a nut may be mentioned.

The gate mechanism 5 includes a swing chute 51, a first gate 52, a fixed chute 53, and a second gate 54. The swing chute 51 has a cylindrical shape and is disposed below the discharge chute 3. The swing chute 51 is configured to be able to swing (rotate) between the first position and the second position around the axis at the upper end side as a center. In FIG. 1, the swing chute 51 located at the first position is indicated by a solid line, and the swing chute 51 located at the second position is indicated by a two-dot dashed line. The article A discharged from the lower end portion of the discharge chute 3 is supplied to the swing chute 51. The swing chute 51 can receive the article A from the discharge chute 3 at the first position and can discharge the article A to the fixed chute 53 at the second position.

The first gate 52 is a gate (shutter) that can be opened and closed with respect to the lower end portion of the swing chute 51. The first gate 52 is closed with respect to the lower end portion of the swing chute 51 located at the first position or the second position, so that the article A supplied to the swing chute 51 is received and temporarily retained in the swing chute 51. Furthermore, the first gate 52 is opened with respect to the lower end portion of the swing chute 51 located at the first position, so that the article A retained in the swing chute 51 is discharged to the outside of the weighing and packaging system 1. In addition, the first gate 52 is opened with respect to the lower end portion of the swing chute 51 located at the second position, so that the article A retained in the swing chute 51 is discharged downward.

The fixed chute 53 has a cylindrical shape and is disposed below the swing chute 51. In this embodiment, the fixed chute 53 is aligned with the swing chute 51 in the vertical direction (vertically). The position of the fixed chute 53 is fixed. The article A discharged from the swing chute 51 located at the second position is supplied to the fixed chute 53. The second gate 54 is a gate that can be opened and closed with respect to the lower end portion of the fixed chute 53. By closing the second gate 54, the article A supplied to the fixed chute 53 is temporarily retained in the fixed chute 53. Furthermore, by opening the second gate 54, the article A retained in the fixed chute 53 is discharged downward. The article A discharged from the fixed chute 53 is supplied to the packaging device 6.

The packaging device 6 is, for example, a bag manufacturing/packaging machine and molds a film into a bag having a predetermined capacity and packages the bag with the articles A supplied from the gate mechanism 5. In accordance with an instruction from the control unit 10, the packaging device 6 can discharge the article A into which the foreign matter is determined to be mixed, to the outside of the weighing and packaging system 1.

The control unit 10 is a calculation device having a central processing unit (CPU), a read only memory (ROM), a random access memory (RAM), and the like. The control unit 10 includes the memory unit 11 which stores information pertaining to the quality of the article A based on a detection result of the foreign matter detecting unit 4. The control unit 10 controls operations of the components of the weighing and packaging system 1 such as operations of the combination weighing device 2 including opening and closing operations of the timing hopper 22, a swing operation of the swing chute 51, and opening and closing operations of the first gate 52 and the second gate 54. Furthermore, the control unit 10 controls the memory unit 11. The control unit 10 is communicably connected to the foreign matter detecting unit 4 and the packaging device 6.

Subsequently, operations of the weighing and packaging system 1 will be described with reference to FIGS. 3 to 6. At the time of starting the operation of FIG. 3, as illustrated in FIG. 4, an article A1 is retained in the fixed chute 53, an article A2 is retained in the swing chute 51, and an article A3 is retained in the timing hopper 22. The article A2 is an article discharged from the combination weighing device 2 next to the article A1, and the article A3 is an article discharged from the combination weighing device 2 next to the article A2. At the time of starting the operation of FIG. 3, all of the timing hopper 22, the first gate 52 and the second gate 54 are closed, and the swing chute 51 is located at the first position. In the following description, a case where a metal M is mixed into the article A3 will be described as an example.

Figure 3:
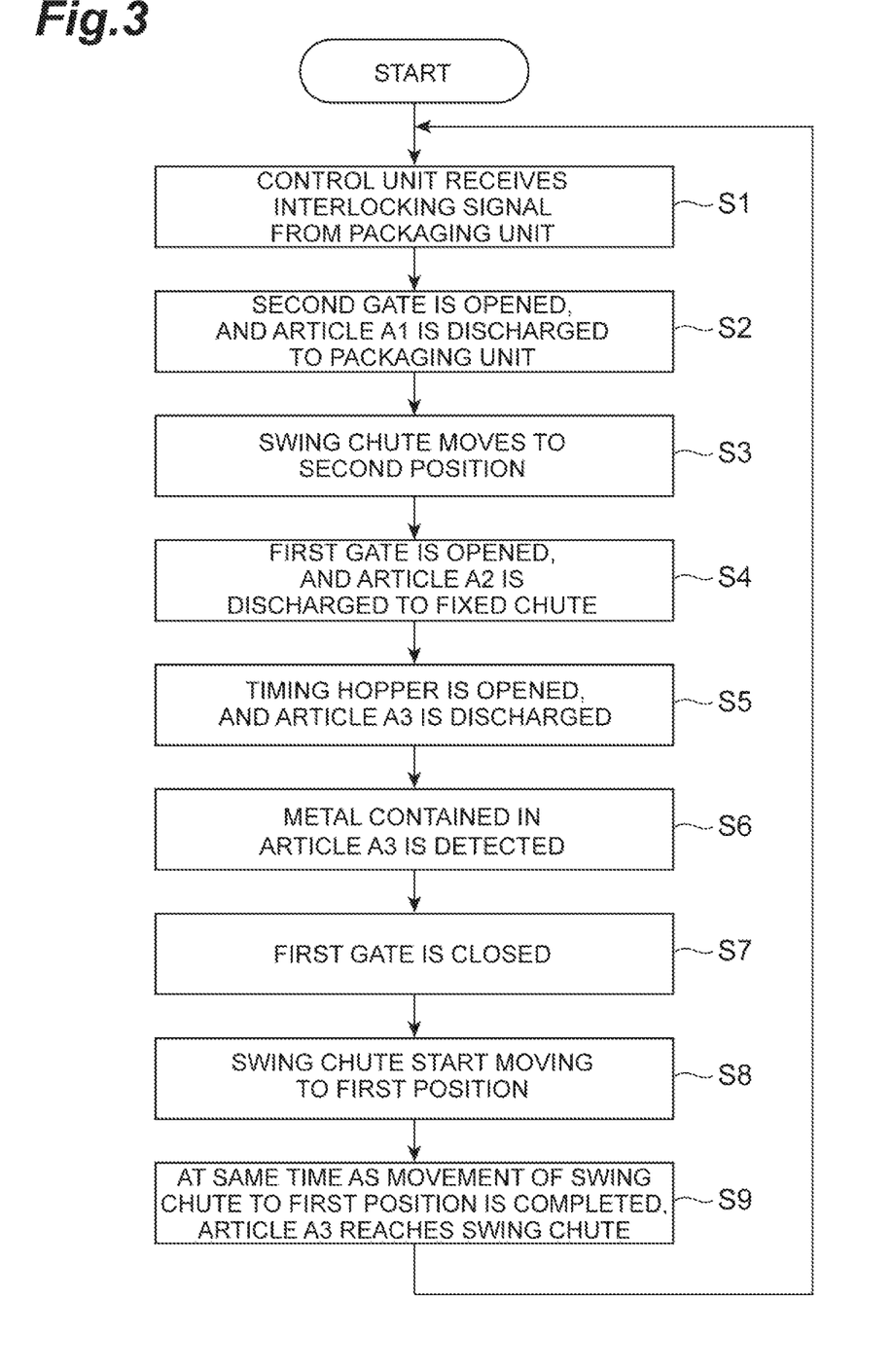
FIG. 3 is a flowchart illustrating operation sequence of the weighing and packaging system of FIG. 1.
Figure 4:
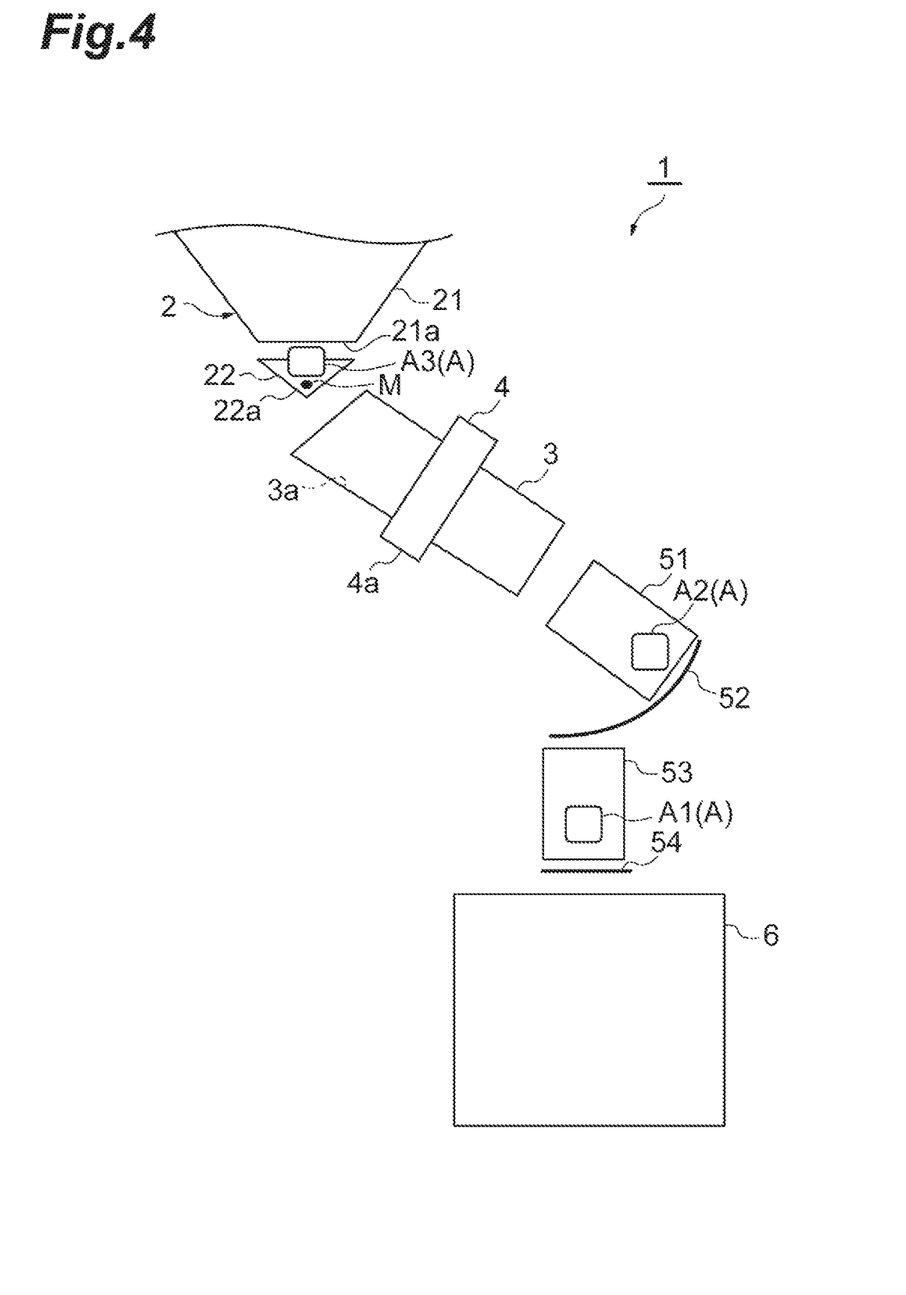
FIG. 4 is a diagram illustrating operations of the weighing and packaging system of FIG. 1.

As illustrated in FIG. 3, first, the control unit 10 receives an interlocking signal from the packaging device 6 (step S1). The interlocking signal is a signal instructing the supply of the article A1 to the packaging device 6. Upon receiving the interlocking signal, the control unit 10 controls the second gate 54 to be opened (step S2). As a result, the article A1 is discharged to the packaging device 6. The second gate 54 is closed, for example, before the execution of the next step S3. Subsequently, the control unit 10 controls the swing chute 51 to move from the first position to the second position (step S3). Subsequently, the control unit 10 controls the first gate 52 to be opened (step S4). As a result, the article A2 is discharged to the fixed chute 53 (refer to FIG. 5).

Subsequently, the control unit 10 controls the timing hopper 22 to be opened (step S5). As a result, the article A3 is discharged from the timing hopper 22 to the discharge chute 3. The timing hopper 22 is closed, for example, before the execution of the next step S6. While the article A3 passes through the discharge chute 3, the metal M is detected by the foreign matter detecting unit 4 (step S6). After the execution of step S5, the control unit 10 controls the first gate 52 to be closed (step S7). Subsequently, the control unit 10 controls the swing chute 51 to start moving from the second position to the first position (step S8). At the same time as the movement of the swing chute 51 to the first position is completed, or immediately after the completion, the article A3 reaches the swing chute 51 (step S9, refer to FIG. 6). The next article A is supplied to the timing hopper 22 before the completion of step S9 after the article A3 is discharged in step S5. After the completion of step S9, the operations of steps S1 to S9 are repeated in order from step S1.

As described above, in the weighing and packaging system 1, the timing at which the article A is discharged from the combination weighing device 2 and the timing at which the first gate 52 is opened and closed are adjusted based on the falling time of the article A from the time when the article is discharged from the combination weighing device 2 to the time when the article reaches the gate mechanism 5. More specifically, the timing of the opening and closing of the timing hopper 22 and the timing of the opening and closing of the first gate 52 are adjusted based on the falling time so that the article A is discharged from the timing hopper 22 in a state where the first gate 52 is opened, and the first gate 52 is closed before the article A discharged from the timing hopper 22 reaches the gate mechanism 5. That is, the time interval from the time when the timing hopper 22 is opened to the time when the first gate 52 is closed is slightly shorter than the falling time. The length of time during which the first gate 52 is in an opened state is set based on the shape of the article A or the like. For example, in a case where the article A is long, the length of time during which the first gate 52 is in an opened state is set longer than that in a case where the article A is short.

Figure 5:
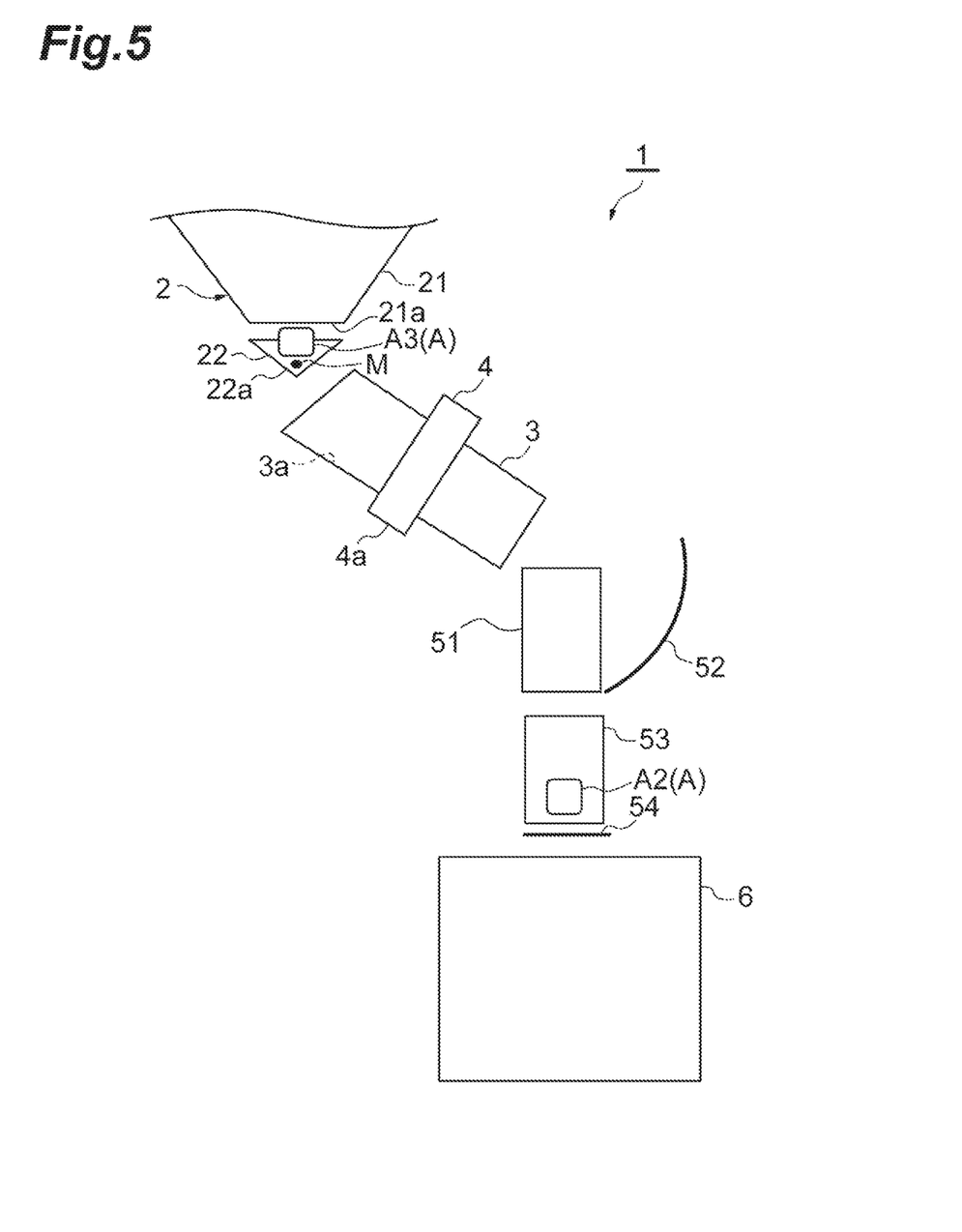
FIG. 5 is a diagram illustrating the operations of the weighing and packaging system of FIG. 1.
Figure 6:
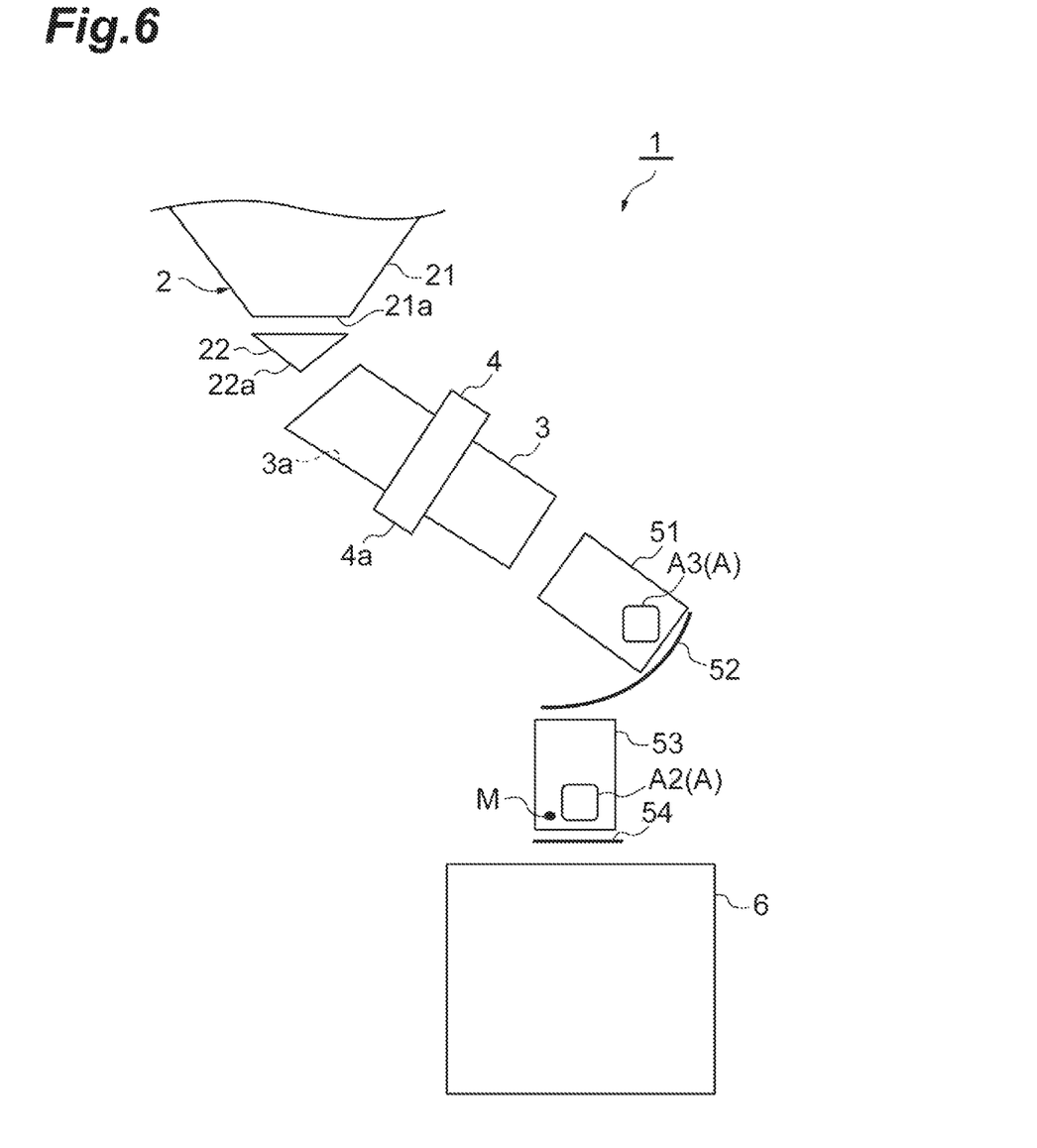
FIG. 6 is a diagram illustrating the operations of the weighing and packaging system of FIG. 1.

In the examples illustrated in FIGS. 4 to 6, before the first gate 52 is closed, the metal M passes through the first gate 52, and the metal M enters the fixed chute 53. This is because the metal M reaches the first gate 52 earlier than the article A. For example, in a case where the article A is an article which has a higher air resistance than the metal M, such as dried bonito, the metal M reaches the first gate 52 earlier than the article A.

Subsequently, the processes executed by the control unit 10 regarding the quality determination for the article A will be described with reference to FIG. 7. Hereinafter, as an example, the processes when an article A (hereinafter, also referred to as an $N^{th}$ article A) discharged from the combination weighing device 2 as the $N^{th}$ (N is an integer of 2 or more) order passes through the foreign matter detecting unit 4 will be described.

First, the control unit 10 determines whether or not a metal is detected with respect to the $N^{th}$ article A by the foreign matter detecting unit 4 (step S11). In a case where a metal is detected with respect to the $N^{th}$ article A by the foreign matter detecting unit 4 (YES in step S11), the control unit 10 proceeds to step S12. On the other hand, in a case where a metal is not detected with respect to the $N^{th}$ article A by the foreign matter detecting unit 4 (NO in step S11), the control unit 10 proceeds to step S13 and controls the memory unit 11 to store the quality information of the $N^{th}$ article as a good quality. Next to step S13, the control unit 10 returns to step S11 and determines whether or not a metal is detected with respect to the article A (hereinafter, also referred to as the $(N+1)^{th}$ article A) discharged from the combination weighing device 2 as the next $(N+1)^{th}$ order by the foreign matter detecting unit 4.

In step S12, the control unit 10 controls the memory unit 11 to forcibly store the quality information of both of the $N^{th}$ article A and the article A (hereinafter, also referred to as the $(N-1)^{th}$ article A) discharged from the combination weighing device 2 as the $(N-1)^{th}$ order as a poor quality. Subsequently, the control unit 10 controls the gate mechanism 5 to discharge the $N^{th}$ article A to the outside (step S14). More specifically, in step S14, the control unit 10 controls the first gate 52 to be opened with respect to the lower end portion of the swing chute 51 located at the first position after controlling the swing chute 51 to move from the second position to the first position, so that the $N^{th}$ article A is discharged at the gate mechanism 5 to the outside. That is, in step S14, the control unit 10 controls the swing chute 51 to move from the second position to the first position so that the $N^{th}$ article A is discharged from the swing chute 51 to the outside. Subsequently, the control unit 10 controls the packaging device 6 to discharge the $(N-1)^{th}$ article A to the outside (step S15). Next to step S15, the control unit 10 returns to step S11 and determines whether or not a metal is detected by the foreign matter detecting unit 4 with respect to the $(N+1)^{th}$ article A. In the example illustrated in FIGS. 4 to 6, the article A3 corresponds to the $N^{th}$ article A, and the article A2 corresponds to the $(N-1)^{th}$ h article A.

As described above, in the weighing and packaging system 1, the timing at which the article A is discharged from the combination weighing device 2 and the timing at which the first gate 52 is opened and closed are adjusted based on the falling time from the time when the article A is discharged from the combination weighing device 2 and to the time when the article A reaches the gate mechanism 5. Therefore, for example, in comparison with a case where the article A is discharged from the combination weighing device 2 in a state where the first gate 52 is closed and the first gate 52 is opened after the article A discharged from the timing hopper 22 reaches the gate mechanism 5, it is possible to improve the operation rate.

However, in such a configuration where the timing at which the article A is discharged from the combination weighing device 2 and the timing at which the first gate 52 is opened and closed are adjusted based on the falling time of the article A from the time when the article discharged from the combination weighing device 2 to the time when the article reaches the gate mechanism 5, as illustrated in FIG. 6, in a case where a metal M is mixed into the article A, there is a possibility that the metal M passes through the first gate 52 before the first gate 52 is closed, and the metal M enters the packaging device 6 side than the first gate 52.

In contrast, in the weighing and packaging system 1, in a case where the foreign matter is detected by the foreign matter detecting unit 4 with respect to the $N^{th}$ article A, the quality information of the $(N-1)^{th}$ article A is forcibly stored in the memory unit 11 as a poor quality (step S12). Therefore, even in a case where the foreign matter mixed into the $N^{th}$ article A enters the $(N-1)^{th}$ article A side, it is possible to suppress the distribution of the $(N-1)^{th}$ article A as a foreign matter mixed article. Therefore, in the weighing and packaging system 1, it is possible to suppress the distribution of the foreign matter mixed article.

In the weighing and packaging system 1, in a case where the foreign matter is detected by the foreign matter detecting unit 4 with respect to the $N^{th}$ article A, the control unit 10 controls the memory unit 11 to store the quality information of the $N^{th}$ article A as a poor quality (step S12). As a result, in a case where the foreign matter mixed into the $N^{th}$ article A is retained in the $N^{th}$ article A side (the article A3 side in the example illustrated in FIGS. 4 to 6), it is possible to suppress the distribution of not only the $(N-1)^{th}$ article A but also the $N^{th}$ article A as a foreign matter mixed article. In the weighing and packaging system 1, in a case where the foreign matter is detected by the foreign matter detecting unit 4 with respect to the $N^{th}$ article A, the two $(N-1)^{th}$ and N th articles A are treated as foreign matter mixed articles. However, since the frequency of foreign matter mixing is rare, the operation rate is not decreased due to this, rather it is possible to improve the operation rate as described above.

The weighing and packaging system 1 further includes the gate mechanism 5 which is disposed below the discharge chute 3 and which receives and temporarily retains the article A discharged and falling from the combination weighing device 2 and discharges the retained article A according to the opening and closing of the first gate 52. Thus, by providing the gate mechanism 5 as a buffer, it is possible to improve the operation rate.

In the weighing and packaging system 1, in a case where the foreign matter is detected by the foreign matter detecting unit 4 with respect to the $N^{th}$ article A, the control unit 10 controls the gate mechanism 5 to discharge the $N^{th}$ article A to the outside (step S14). Therefore, in a case where the foreign matter is detected by the foreign matter detecting unit 4 with respect to the $N^{th}$ article A, the $N^{th}$ article A can be discharged at the gate mechanism 5 to the outside.

In the weighing and packaging system 1, the timing at which the article A is discharged from the combination weighing device 2 and the timing at which the first gate 52 is opened and closed are adjusted based on the falling time from the time when the article A is discharged from the combination weighing device 2 to the time when the article A reaches the gate mechanism 5 so that the article A is discharged from the combination weighing device 2 in a state where the first gate 52 is opened, and the first gate 52 is closed before the article A discharged from the combination weighing device 2 reaches the first gate 52. As a result, it is possible to reliably improve the operation rate.

In the weighing and packaging system 1, in a case where the foreign matter is detected by the foreign matter detecting unit 4 with respect to the $N^{th}$ article A, the control unit 10 controls the packaging device 6 to discharge the $(N-1)^{th}$ article A to the outside (step S15). As a result, in a case where the foreign matter is detected by the foreign matter detecting unit 4 with respect to the $N^{th}$ article A, the $(N-1)^{th}$ article A can be discharged at the packaging device 6 to the outside.

Although the embodiment of the present invention has been described above, the present invention is not limited to the above-described embodiment. For example, as in Modified Example illustrated in FIG. 8, the weighing and packaging system 1 may further include an inspection unit 7 which performs predetermined inspection on the articles A packaged and discharged by the packaging device 6. The weighing and packaging system 1 further includes a conveyor 8a which conveys the articles A from the packaging device 6 to the inspection unit 7 and a conveyor 8b which conveys the articles A having been inspected by the inspection unit 7 to the next process.

Figure 8:
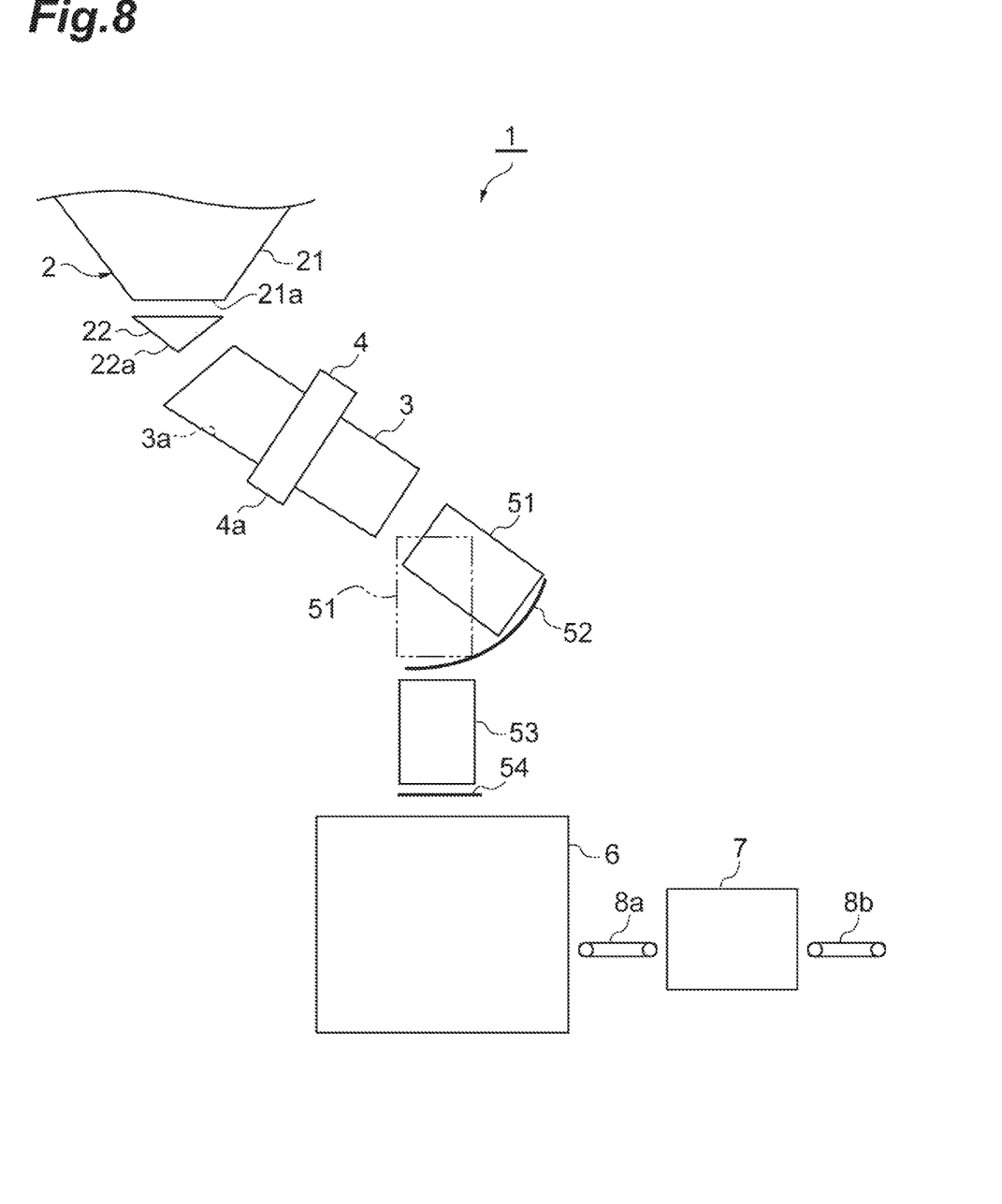
FIG. 8 is a schematic configuration diagram of a weighing and packaging system according to Modified Example.

The inspection unit 7 is, for example, an X-ray inspection device that detects the foreign matter contained in the article A by using the X-ray transparency. In the X-ray inspection, it is possible to detect the foreign matter having X-ray transparency different from that of the article A. The inspection unit 7 acquires the X-ray transmission image of the article A and inspects the article A based on the X-ray transmission image. The article A determined to be a defective article by the inspection unit 7 is sorted outside the production line by a sorting device (not illustrated) arranged downstream of the conveyor 8b. On the other hand, the article A determined to be a non-defective article by the inspection unit 7 passes through the sorting device as it is.

The control unit 10 is communicably connected to the inspection unit 7. The control unit 10 stores, in the memory unit 11, the inspection result by the inspection unit 7 for the articles A to be sequentially supplied. In Modified Example, the control unit 10 does not control the packaging device 6 to discharge the $(N-1)^{th}$ article A to the outside in step S15 of FIG. 7. Then, in a case where the inspection result by the inspection unit 7 for the $(N-1)^{th}$ article A is a good quality, when the quality information of the $(N-1)^{th}$ article A is a poor quality, the control unit 10 maintains the quality information of the $(N-1)^{th}$ article A as a poor quality. As a result, even in a case where the inspection result by the inspection unit 7 for the $(N-1)^{th}$ article A is a good quality, when the quality information of the $(N-1)^{th}$ article A is a poor quality, the quality information of the $(N-1)^{th}$ article A is maintained as a poor quality, and the $(N-1)^{th}$ article A is sorted outside the production line in the sorting device. In this manner, according to Modified Example, similarly to the above-described embodiment, even in a case where the foreign matter mixed into the $N^{th}$ article A enters the $(N-1)^{th}$ article A side, it is possible to suppress the distribution of the $(N-1)^{th}$ article A as a foreign matter mixed article, and thus, it is possible to suppress the distribution of a foreign matter mixed article while improving the operation rate.

Figure 7:
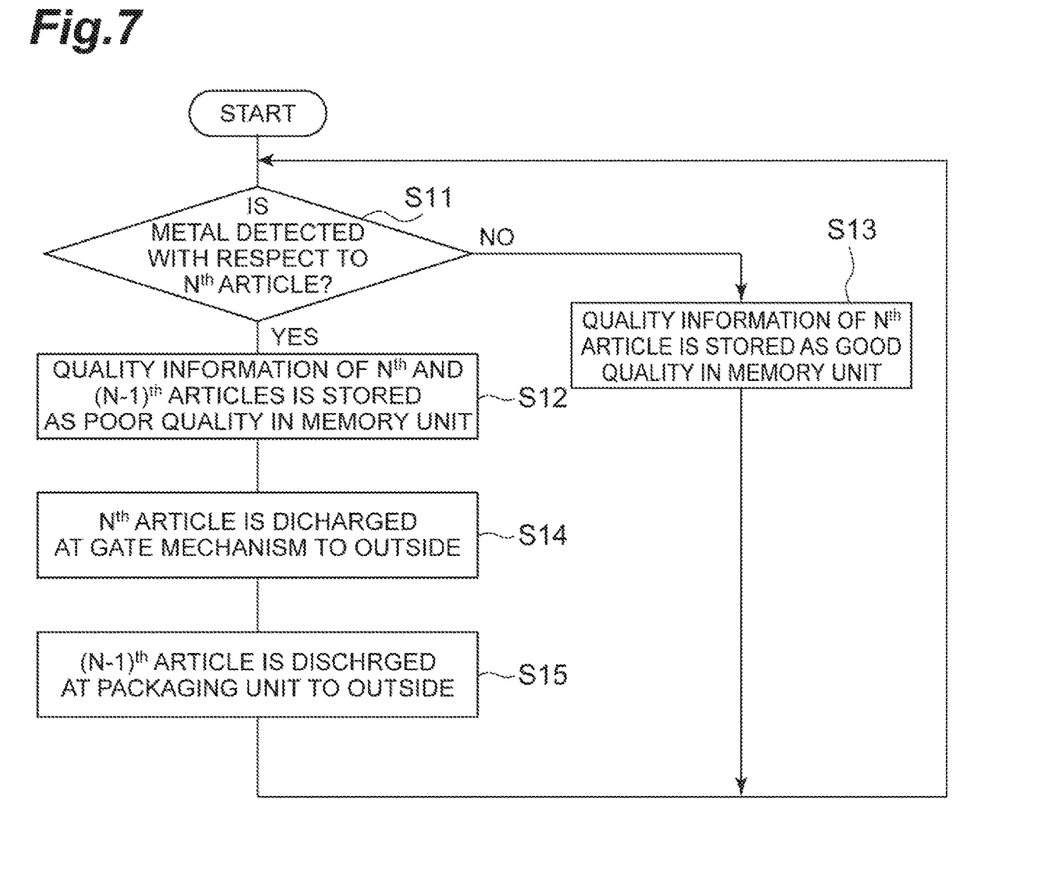
FIG. 7 is a flowchart illustrating a process flow executed in the weighing and packaging system of FIG. 1.

In Modified Example, the control unit 10 may not control the gate mechanism 5 to discharge the $N^{th}$ article A to the outside in step S14 of FIG. 7. Then, in a case where the inspection result by the inspection unit 7 for the $N^{th}$ article A is a good quality, when the quality information of the $N^{th}$ article A is a poor quality, the control unit 10 may maintain the quality information of the $N^{th}$ article A as a poor quality. With this configuration, even in a case where the inspection result by the inspection unit 7 for the $N^{th}$ article A is a good quality, when the quality information of the $N^{th}$ article A is a poor quality, the quality information of the $N^{th}$ article A is maintained as a poor quality, so that the $N^{th}$ article A is sorted outside the production line in the sorting device. Even with such a configuration, similarly to the above-described embodiment, it is possible to suppress the distribution of not only the $(N-1)^{th}$ article A but also the $N^{th}$ article A as a foreign matter mixed article.

In the above-described embodiment, the combination weighing device 2 may be any weighing device as long as the weighing device weighs and sequentially discharges the articles A and may be replaced with a weighing device that does not perform the combination weighing process. The discharge chute 3 may not be provided and the foreign matter detecting unit 4 may detect the foreign matter on a discharge path of the article A between the combination weighing device 2 and the gate mechanism 5. The gate mechanism 5 may have only one of the first gate 52 and the second gate 54. The gate mechanism 5 may not be provided, and for example, the articles A discharged from the discharge chute 3 may be directly supplied to the packaging device 6. The packaging device 6 may be any packaging device as long as the packaging device packages the articles A discharged from the discharge chute 3 and may not be a bag manufacturing/packaging machine. The packaging device 6 may not be provided. The memory unit 11 may be configured separately from the control unit 10 and may be communicably connected to the control unit 10.

In step S12 of FIG. 7 in the above-described embodiment, the control unit 10 may not control the memory unit 11 to store the quality information of the $N^{th}$ article A as a poor quality. In this case, the gate mechanism 5 is not controlled to discharge the $N^{th}$ article A to the outside. For example, in a case where the foreign matter is mixed into the $N^{th}$ article A, when the foreign matter necessarily enters the $(N-1)^{th}$ article A side, such a configuration may be adopted.

In the step S14 of FIG. 7 in the above-described embodiment, the control unit 10 may not control the gate mechanism 5 to discharge the $N^{th}$ article A to the outside. In this case, for example, the $(N-1)^{th}$ article A may be eliminated as a defective article in a later process than the packaging device 6. Similarly, in step S15 of FIG. 7 in the above-described embodiment, the packaging device 6 may not be controlled to discharge the $(N-1)^{th}$ article A to the outside. In this case, for example, the $(N-1)^{th}$ article A may be eliminated as a defective article in a later process than the packaging device 6. In the above-described embodiment, the configuration where the foreign matter detecting unit 4 detects, for example, the metal contained in the article A as the foreign matter by utilizing the interaction between the magnetic field and the metal has been described. However, the present invention is not limited to this configuration, and the foreign matter detecting unit 4 may be configured to capture an image with predetermined time interval and to detect the foreign matter from the images. In this case, the image may be a still image or a moving image. That is, the foreign matter detecting unit 4 may use a method of directly detecting the foreign matter or may use a method of indirectly detecting the foreign matter from an image.

REFERENCE SIGNS LIST

1: weighing and packaging system, 2: combination weighing device (weighing unit), 3: discharge chute, 4: foreign matter detecting unit, 5: gate mechanism, 52: first gate, 6: packaging device (packaging unit), 7: inspection unit, 10: control unit, 11: memory unit, A: article.

The invention claimed is:

1. A weighing and packaging system comprising:
a weighing unit which weighs and sequentially discharges articles;
a discharge chute which is disposed below the weighing unit and through which the articles discharged from the weighing unit pass;
a foreign matter detecting unit which detects the foreign matter contained in the article passing through the discharge chute;
a memory unit which stores quality information pertaining to quality of the article based on a detection result of the foreign matter detecting unit; and
a control unit which controls the memory unit,
wherein in a case where the foreign matter is detected by the foreign matter detecting unit with respect to the $N^{th}$ (N is an integer of 2 or more) article discharged from the weighing unit, the control unit controls the memory unit to forcibly store the quality information of the $(N-1)^{th}$ article discharged from the weighing unit as a poor quality.

2. The weighing and packaging system according to claim 1, wherein in a case where the foreign matter is detected by the foreign matter detecting unit with respect to the $N^{th}$ article discharged from the weighing unit, the control unit controls the memory unit to store the quality information of the $N^{th}$ article discharged from the weighing unit as a poor quality.

3. The weighing and packaging system according to claim 1, further comprising a gate mechanism which is disposed below the discharge chute and which receives and temporarily retains the article being discharged and falling from the weighing unit and discharges the retained article by opening and closing a gate.

4. The weighing and packaging system according to claim 3, wherein in a case where the foreign matter is detected by the foreign matter detecting unit with respect to the $N^{th}$ article discharged from the weighing unit, the control unit controls the gate mechanism to discharge the $N^{th}$ article discharged from the weighing unit, to the outside.

5. The weighing and packaging system according to claim 4,
wherein the gate mechanism includes a swing chute configured to be able to swing between a first position and a second position, and
wherein in a case where the foreign matter is detected by the foreign matter detecting unit with respect to the $N^{th}$ article discharged from the weighing unit, the control unit controls the swing chute to move from the second position to the first position so that the $N^{th}$ article discharged from the weighing unit is discharged from the swing chute to the outside.

6. The weighing and packaging system according to claim 3, wherein a timing at which the article is discharged from the weighing unit and a timing at which the gate is opened and closed are adjusted based on a falling time of the article from the time when the article is discharged from the weighing unit to the time when the article reaches the gate mechanism.

7. The weighing and packaging system according to claim 6, wherein the timing at which the article is discharged from the weighing unit and the timing at which the gate is opened and closed are adjusted based on the falling time so that the article is discharged from the weighing unit in a state where the gate is opened, and the gate is closed before the article discharged from the weighing unit reaches the gate.

8. The weighing and packaging system according to claim 3, wherein the gate mechanism includes a swing chute which is configured to be able to swing between a first position and a second position and a fixed chute which is fixed below the swing chute and to which the article discharged from the swing chute located at the second position is supplied.

9. The weighing and packaging system according to claim 1, further comprising a packaging unit which packages the article discharged from the discharge chute,
wherein in a case where the foreign matter is detected by the foreign matter detecting unit with respect to the $N^{th}$ article discharged from the weighing unit, the control unit controls the packaging unit to discharge the $(N-1)^{th}$ article discharged from the weighing unit, to the outside.

10. The weighing and packaging system according to claim 1, further comprising an inspection unit which performs predetermined inspection on the article on the downstream side of the foreign matter detecting unit,
wherein in a case where an inspection result by the inspection unit for the $(N-1)^{th}$ article discharged from the weighing unit is a good quality, when the quality information of the $(N-1)^{th}$ article discharged from the weighing unit is a poor quality, the control unit maintains the quality information of the $(N-1)^{th}$ article discharged from the weighing unit as a poor quality.

* * * * *